United States Patent [19]

Hiday

[11] Patent Number: 4,980,990

[45] Date of Patent: Jan. 1, 1991

[54] INSECT TRAP FOR A BIRD FEEDER

[76] Inventor: Rex H. Hiday, R. 5, Box 488, Cynthinana, Ky. 41031

[21] Appl. No.: 451,143

[22] Filed: Dec. 15, 1989

[51] Int. Cl.⁵ ............................................. A01M 1/10
[52] U.S. Cl. ...................................... 43/107; 43/122
[58] Field of Search .................. 119/52.1, 57.8, 61; 43/107, 122, 132.1

[56] References Cited

U.S. PATENT DOCUMENTS

| | | | |
|---|---|---|---|
| 1,786,704 | 12/1930 | Deibele | 43/122 |
| 3,187,722 | 6/1965 | Gilmore et al. | 119/61 |
| 3,195,510 | 7/1965 | Bernstein | 119/61 |
| 3,997,999 | 12/1976 | Evans | 43/107 |
| 4,217,723 | 8/1980 | Hrebec | 43/122 |
| 4,328,636 | 5/1982 | Johnson | 43/122 |
| 4,476,647 | 10/1984 | Hall | 43/122 |
| 4,546,730 | 10/1985 | Holland | 119/61 |
| 4,829,934 | 5/1989 | Blasbalg | 119/57.8 |

Primary Examiner—Kurt Rowan
Attorney, Agent, or Firm—Warren D. Flackbert

[57] ABSTRACT

An insect trap used in combination with a bird feeder which presents a water barrier to isolate movement of insects onto the bird feeder which hangs therefrom. Basically, the trap presents a water receiving cavity defined by a base wall, a side wall and a centrally disposed stem. Means are provided for positioning the insect trap between a hanger and the bird feeder.

3 Claims, 1 Drawing Sheet

INSECT TRAP FOR A BIRD FEEDER

As is known, the interest in feeding wild birds, such as humming birds and orioles, is widespread, based on, among other reasons, the enjoyment and perpetuation of nature. A humming bird or oriole feeder is distinct from other forms of wild bird feeder, where a typical problem occasioned by the use of such lies in the attraction of ants and other insects because of the usage of a sweetened and reddened solution for feeding purposes. Thus, a need has arisen for isolating the bird feeder and reducing the aforesaid problem during a use condition.

BACKGROUND OF THE INVENTION

The invention satisfies the preceding in presenting an insect trap located between a common bird feeder hanger and the bird feeder per se, in the form of a water receiving cavity, the latter serving a natural barrier to ants and other traveling insects by blocking the entry of such into the bird feeder. In other words, the trap of the invention is typically positioned between the hanger and the bird feeder, and assembly at a use condition is readily achievable.

BRIEF DESCRIPTION OF THE DRAWING

A better understanding of the present invention will become more apparent from the following description, taken in conjunction with the accompanying drawing, wherein.

Figure 1:
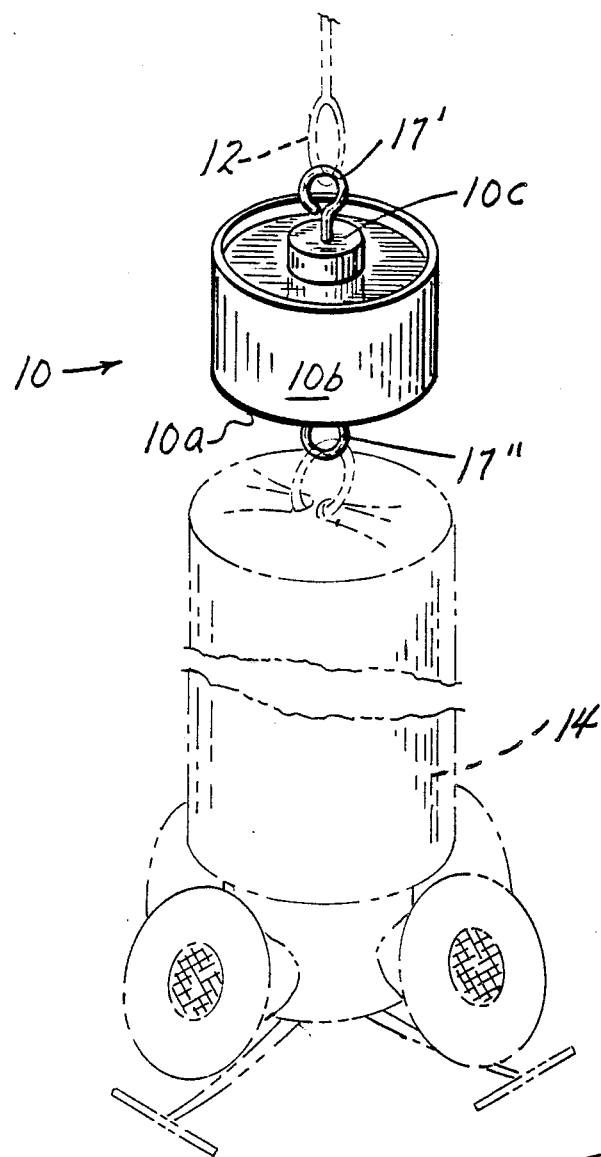
FIG. 1 is a perspective view showing an insect trap in accordance with the teachings of the present invention at a use condition.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, and particularly FIG. 1, the insect trap 10 is disposed, when at a use condition, between a conventional hanger 12 used to position a bird feeder 14 and the bird feeder 14 (each through a hooking relationship). The bird feeder 14, designed for usage by humming birds and/or orioles, is presented in a bright color for bird attraction.

The insect trap 10 is defined by a bottom wall 10a, a side wall 10b and a central stem 10c, in the mid-region thereof, typically fabricated from injection molded plastic resin (to preclude leaking).

Figure 2:
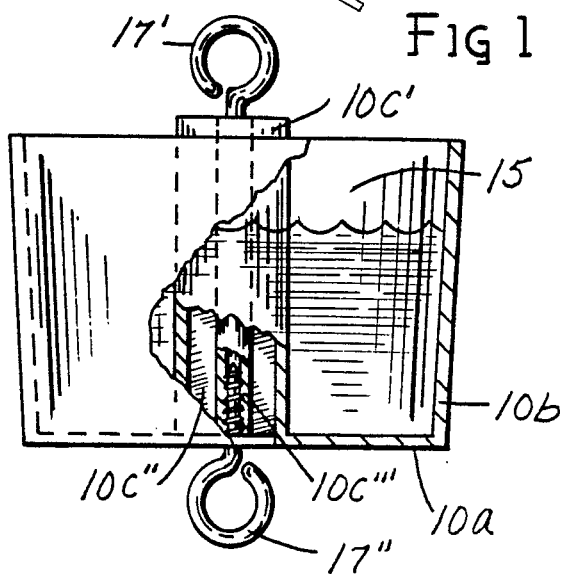
FIG. 2 is a view in side elevation, looking directly toward the assembly of FIG. 1; and, FIG. 3 is a top plan view of the trap, looking directly downwardly onto the solid line showing of FIG. 1.
Figure 3:
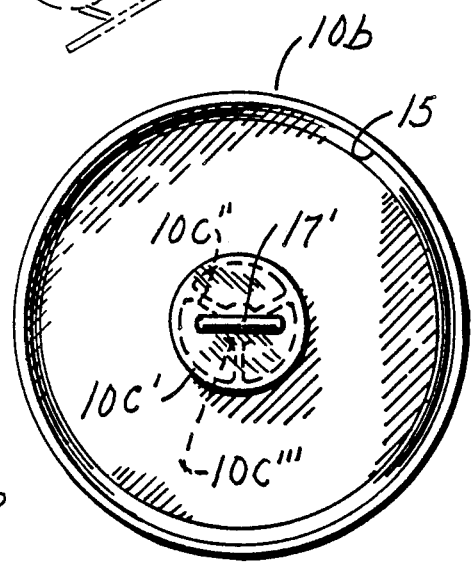

The central stem 10c may be solid (FIG. 1) or may be defined by a hollow cylinder 10c' (FIGS. 2 and 3), supporting, by vanes 10c'', a hollow screw receiving shaft 10c'''. In any event, a liquid receiving cavity 15 is defined by the bottom wall 10a, the side wall 10b and the stem 10c-10c'.

In use, a typical assembly includes, as stated, hanger 12, trap 10 and the bird feeder 14 (hooks 17'-17'' on trap 10 complete the arrangement). Cavity 15 is filled with water, as to a level below the top end surface of the stem 10c-10c', serving to trap ants or like insects in the latters effort to travel onto the bird feeder 14. In other words, the body of water, serving as a barrier, precludes movement of insects beyond the trap 10 of the invention.

Thus, it should be evident that the invention effectively blocks insect movement onto a bird feeder, being easily assembled to a use condition, and solving what otherwise required specialized coating and/or spraying for a less than satisfactory end result.

The insect trap described herein is susceptible to various changes within the spirit of the invention, including, by way of example, dimensioning; material selection; the precise arrangement for positioning the trap in a use condition; and, the like. Thus, the preceding should be considered illustrative and not as limiting the scope of the following claims:

I claim:

1. A trap used to stop the travel of ants and like crawling insects to a bird feeder comprising a body having a base wall, a side wall, a stem centrally disposed on said base wall and an open top, and oppositely extending means selectively positioning said trap between hanger means and said bird feeder, where a liquid receiving cavity is defined in said body between said side wall, said base wall and said centrally disposed stem, where said liquid is introduced through said open top, where first positioning means extending from the upper end of said stem serves to engage said hanger means and carry said trap, and where other positioning means secured through said bottom wall at the lower end of said stem serves to carry said bird feeder.

2. The insect trap of claim 1 where water is received in said liquid receiving cavity.

3. The insect trap of claim 1 where the level of said liquid is below the upper end surface of said centrally disposed stem.

* * * * *